United States Patent
Galan

(10) Patent No.: US 7,315,730 B2
(45) Date of Patent: Jan. 1, 2008

(54) ARCHITECTURE FOR A RECEIVER FRONT END HAVING DUAL OUTPUT LOW NOISE AMPLIFIER DRIVING SEPARATE PRE-SELECTORS COUPLED TO A TRANSFORMER FOR SINGLE ENDED OUTPUT

(75) Inventor: Ariel L. Galan, Pembroke Pines, FL (US)

(73) Assignee: Motorola, Inc., Schaumburg, IL (US)

( * ) Notice: Subject to any disclaimer, the term of this patent is extended or adjusted under 35 U.S.C. 154(b) by 52 days.

(21) Appl. No.: 11/152,798

(22) Filed: Jun. 14, 2005

(65) Prior Publication Data

US 2006/0281426 A1 Dec. 14, 2006

(51) Int. Cl.
*H04B 17/02* (2006.01)

(52) U.S. Cl. ............... 455/137; 455/303; 455/306; 455/180.1; 455/334; 375/349; 375/346

(58) Field of Classification Search ............ 455/168.1, 455/180.1, 187.1, 188.1, 189.1, 303, 307, 455/552.1, 550.1, 575.1, 425, 456.5, 561, 455/553.1, 191.1, 213, 311, 340, 292, 349, 455/339, 424, 179.1, 456.6, 188.2, 286, 289, 455/290, 323, 313, 137, 306; 330/301, 296, 330/127, 98–100, 295, 310, 132–134, 124 R, 330/150, 84; 333/133, 126, 193, 196, 128, 333/185, 175, 129; 375/349, 136, 219, 220, 375/132, 141, 142, 377, 316, 346; 327/551, 327/113, 563, 565, 11, 56, 168
See application file for complete search history.

(56) References Cited

U.S. PATENT DOCUMENTS

| | | | | |
|---|---|---|---|---|
| 4,499,602 A | * | 2/1985 | Hermeling et al. ...... | 455/180.3 |
| 4,555,809 A | * | 11/1985 | Carlson .................... | 455/190.1 |
| 4,945,317 A | * | 7/1990 | Sato et al. ................. | 330/301 |
| 5,184,096 A | * | 2/1993 | Wakino et al. ............. | 333/175 |
| 5,477,188 A | * | 12/1995 | Chawla et al. ............. | 330/269 |
| 5,537,680 A | * | 7/1996 | Bruno ......................... | 455/15 |
| 5,613,234 A | * | 3/1997 | Vella-Coleiro ............. | 455/340 |
| 5,815,052 A | * | 9/1998 | Nakajima et al. ........... | 333/175 |
| 5,815,804 A | * | 9/1998 | Newell et al. ................ | 455/78 |
| 5,926,751 A | * | 7/1999 | Vlahos et al. .............. | 455/280 |
| 5,995,814 A | * | 11/1999 | Yeh ........................ | 455/180.1 |
| 6,043,725 A | * | 3/2000 | Taguchi et al. ............. | 333/193 |
| 6,075,996 A | * | 6/2000 | Srinivas .................... | 455/552.1 |
| 6,115,592 A | * | 9/2000 | Ueda et al. ................. | 455/307 |
| 6,125,107 A | * | 9/2000 | Johnson et al. ............. | 370/241 |
| 6,466,768 B1 | * | 10/2002 | Agahi-Kesheh et al. ...... | 455/78 |

(Continued)

FOREIGN PATENT DOCUMENTS

JP 05-129889 * 5/1993

*Primary Examiner*—Edward F. Urban
*Assistant Examiner*—Charles Chow
(74) *Attorney, Agent, or Firm*—Barbara R. Doutre

(57) ABSTRACT

An architecture for a receiver front end utilizes a dual output low noise amplifier (102) driving separate, fixed preselectors (104, 106) coupled to a transformer (108) to generate a single ended output (113). A pair of blocks coupled in series provides a dual band output. Additional pairs of blocks (201, 203) can be cascaded in parallel to provide additional frequency bands of operation. The front end architecture of the present invention provides switchless multi-band operation to a communication device.

15 Claims, 3 Drawing Sheets

U.S. PATENT DOCUMENTS

| | | | |
|---|---|---|---|
| 6,522,307 B2* | 2/2003 | Kim | 343/850 |
| 6,525,626 B2* | 2/2003 | Mandai et al. | 333/134 |
| 6,549,560 B1* | 4/2003 | Maiuzzo et al. | 375/136 |
| 6,584,304 B1* | 6/2003 | Norholm et al. | 455/188.1 |
| 7,031,689 B2* | 4/2006 | Frank | 455/333 |
| 7,202,734 B1* | 4/2007 | Raab | 330/126 |
| 2002/0039038 A1* | 4/2002 | Miyazawa | 327/113 |
| 2004/0027136 A1* | 2/2004 | Golo | 324/539 |
| 2005/0083133 A1* | 4/2005 | Amano | 330/301 |
| 2006/0164171 A1* | 7/2006 | Wu | 330/301 |
| 2006/0208791 A1* | 9/2006 | Vihonen | 327/551 |

* cited by examiner

ARCHITECTURE FOR A RECEIVER FRONT END HAVING DUAL OUTPUT LOW NOISE AMPLIFIER DRIVING SEPARATE PRE-SELECTORS COUPLED TO A TRANSFORMER FOR SINGLE ENDED OUTPUT

TECHNICAL FIELD

This invention relates in general to receivers for use in communication devices and more particularly to multi-band receivers.

BACKGROUND

Communication devices, such as two-way radios, mobile radios and cell phones, are used in variety of applications. The ability for these devices to communicate over several frequency bands is becoming increasingly prevalent. Present multi-band receiver architectures utilize extensive radio frequency (RF) switching networks in the front end to select an appropriate filtering path for each band. Some architectures support as many as five bands (VHF, UHF1, UHF2, 700 MHz and 800 MHz) which can result in excessive front end loss due to the required switching. Theses losses can degrade receiver sensitivity and/or intermodulation distortion. Parts count, board area and cost also present challenges when designing a receiver front end.

Accordingly, it would be highly beneficial to have an improved receiver front end for multi-band operation.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
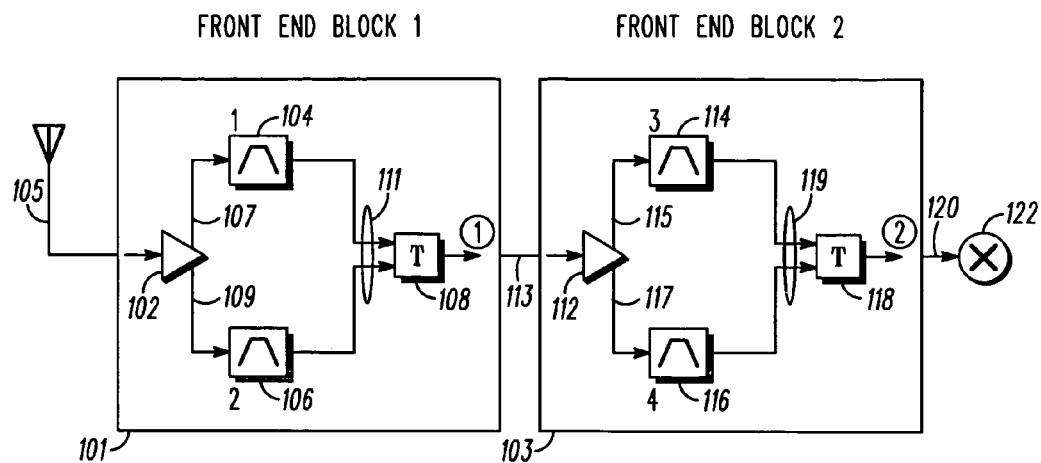
FIG. 1 is a block diagram of architecture for a receiver front end in accordance with the present invention.

While the specification concludes with claims defining the features of the invention that are regarded as novel, it is believed that the invention will be better understood from a consideration of the following description in conjunction with the drawing figures, in which like reference numerals are carried forward.

The present invention may be embodied in several forms and manners. The description provided below and the drawings show exemplary embodiments of the invention. Those of skill in the art will appreciate that the invention may be embodied in other forms and manners not shown below. The invention shall have the full scope of the claims and shall not be limited by the embodiments shown below. It is further understood that the use of relational terms, if any, such as first, second, top and bottom, front and rear and the like are used solely for distinguishing one entity or action from another, without necessarily requiring or implying any such actual relationship or order between such entities or actions.

Figure 2:
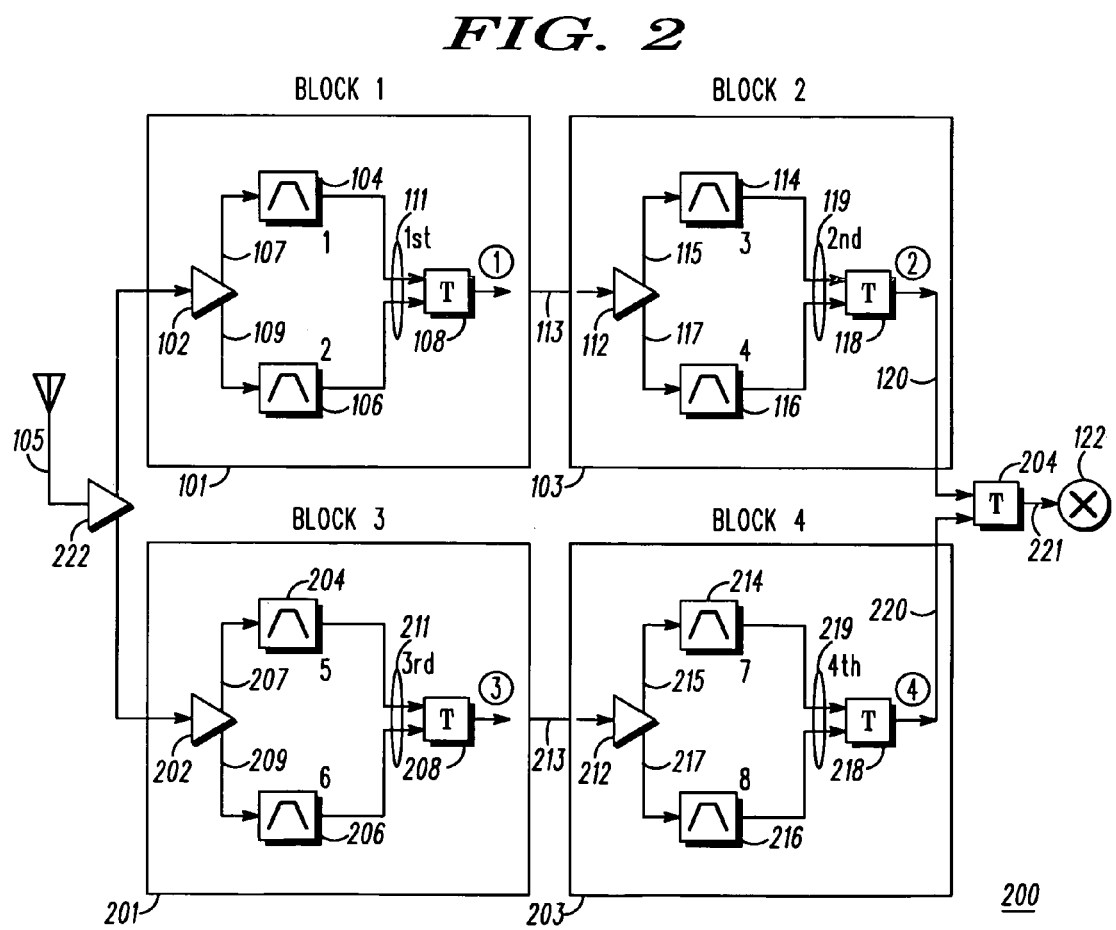
FIG. 2 is a block diagram of the architecture of FIG. 1 implemented in a multi-band application in accordance with an embodiment of the invention.
Figure 3:
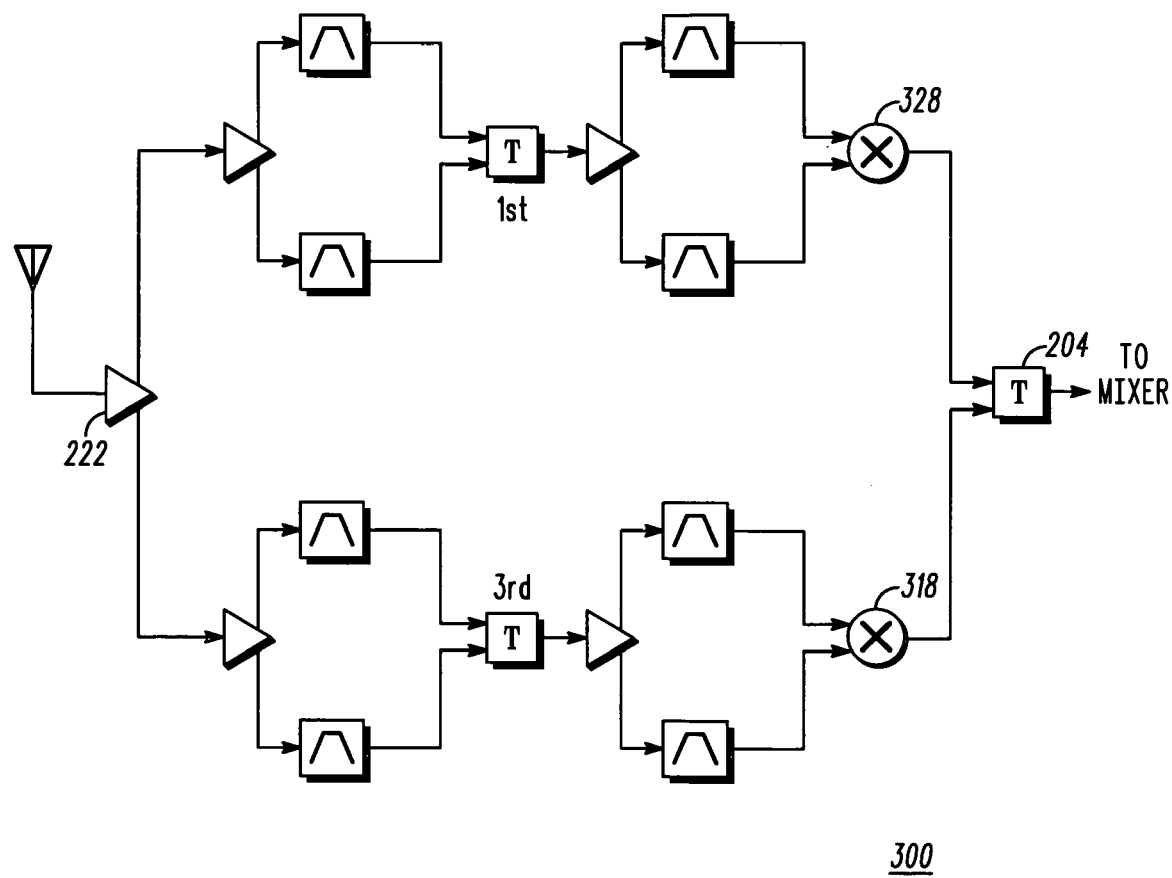
FIG. 3 is a block diagram of the architecture of FIG. 1 implemented in a multi-band application in accordance with another embodiment of the invention.
Figure 4:
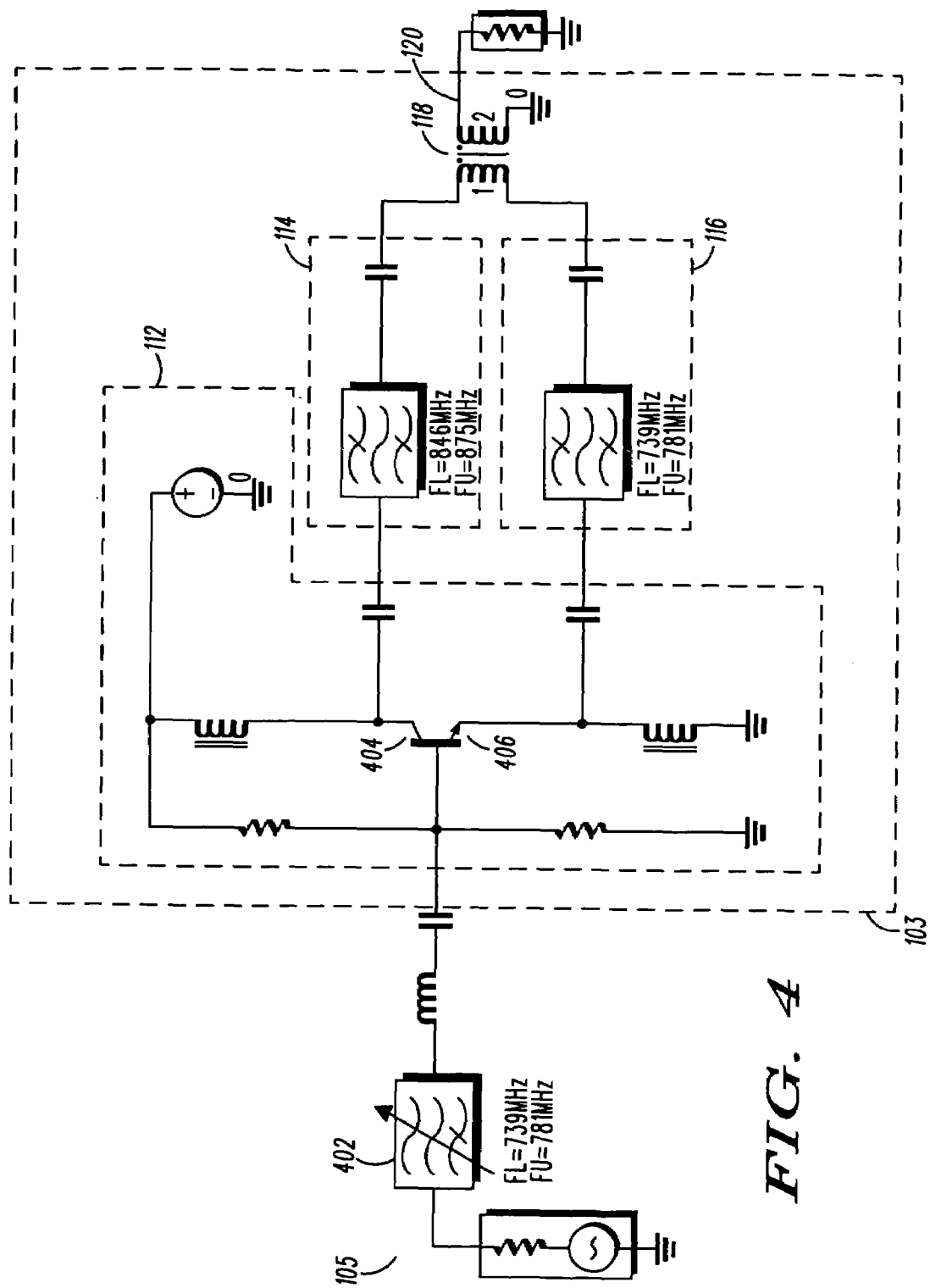
FIG. 4 is an example of a schematic representation of the receiver architecture block in accordance with an embodiment of the invention.

In accordance with the present invention and referring to FIG. 1, there is provided herein an architecture for a receiver front end of a communication device 100. Briefly, a receiver front end block 101 is formed of a dual output low noise amplifier 102 driving separate, fixed preselectors 104, 106 coupled to a transformer 108 to generate a single ended output 113. A pair of blocks 101,103 is coupled in series to provide a dual band output 120. As seen in FIGS. 2 and 3, additional pairs of blocks 201, 203 can be cascaded in parallel to provide additional frequency bands of operation. A tunable pre-selector 402 can be used in conjunction with a single receiver front end block 103 as shown in FIG. 4. The front end architecture of the present invention provides switchless multi-band operation to a communication device.

Referring back to FIG. 1 in further detail, the first front end block 101 comprises a first low-noise-amplifier (LNA) 102 for amplifying a received signal 105, the LNA generating first and second amplified signals 107, 109. A first fixed preselector 104 filters the first amplified signal 107 utilizing a first frequency band, and the second fixed preselector 106 filters the second amplified signal 109 using a second frequency band, thereby providing a first filtered dual band signal 111. A means for converting the first filtered dual band signal 111 to a single ended output signal 113 is accomplished via transformer 108.

In accordance with the present invention, the second front end block 103 includes a second low-noise-amplifier (LNA) 112 for amplifying the single ended output signal 113. The second LNA 112 generates third and fourth amplified signals 115, 117. A third fixed pre-selector 114 filters the third amplified signal 115 utilizing a third frequency band, and a fourth fixed pre-selector 116 filters the fourth amplified signal 117 using a fourth frequency band, thereby providing a second filtered dual band signal 119. A means for converting the second filtered dual band signal 119 to a second single ended output signal 120 is achieved using transformer 118. Architecture 100 thus selectively provides two RF bands without the use of switches.

The second single-ended output 120 is provided to a frequency mixer 122 of the communication device. In this embodiment of the invention, both the first and second means for converting 108, 118 are shown as transformers. As an alternative embodiment of the invention, the first means for converting 108 can be a transformer while the second means for converting 118 can be a mixer.

FIGS. 2 and 3 represent alternative embodiments of the invention that expand the multi-band functionality of the architecture beyond dual band operation. Architectures 200 and 300 include third and fourth front end blocks 201, 203 formed similarly to front end block 101 and coupled in series. Series coupled blocks 201, 203 are also cascaded in parallel to the first and second front end blocks 101, 103 between an amplifier 222 and a transformer 204 to selectively provide four RF bands to mixer 122.

Referring to FIG. 2, the third front end block 201 comprises a third low-noise-amplifier (LNA) 202 for amplifying the received signal, the third LNA generating a fifth and sixth amplified signals 207, 209. A fifth fixed pre-selector 204 filters the fifth amplified signal 207 utilizing a fifth frequency band, and a sixth fixed pre-selector 206 filters the sixth amplified signal 209 using a sixth frequency band. The fifth and sixth fixed preselectors 204, 206 thereby provide a third filtered dual band signal 211. A means for converting the third filtered dual band signal 211 to a third single ended output signal 213 is achieved via transformer 208.

In accordance with this alternative embodiment of the invention, the fourth front end block, comprises a fourth low-noise-amplifier (LNA) 212 for amplifying the third single ended signal 213, the fourth LNA generating seventh and eighth amplified signals 215, 217. A seventh fixed pre-selector 214 filters the seventh amplified signal 215 utilizing a seventh frequency band, and an eighth fixed pre-selector 216 filters the eighth amplified signal 217 using a eighth frequency band. The seventh and eighth fixed preselectors 214, 216 thus provide a fourth filtered dual band signal 219. A means for converting the fourth filtered dual band signal 219 to a fourth single ended output signal 220 is achieved via a transformer 218 (or as shown in FIG. 3 a mixer 318). The second and fourth single ended output signals 120, 220 are coupled to transformer 204 thereby selectively providing four RF frequency bands via signal path 221 to mixer 122.

FIG. 3 shows a multi-band receiver front end architecture 300 similar to that shown in FIG. 2, except that the means for converting the second filtered dual band signal 118 is replaced with a mixer 328 and the means of converting the fourth filtered dual band signal 218 is replaced with a mixer 318.

FIG. 4 is an example of a schematic representation of the receiver architecture block in accordance with an embodiment of the invention. In this embodiment, input signal 105 is received by tunable front end filter 402 coupled in series with single front end block 103 from FIG. 1. Receiver front end block 103 comprises low noise transistor amplifier (LNA) 112 having collector and emitter outputs 404, 406 respectively. In accordance with the present invention, outputs 404, 406 drive the separate, fixed, preselectors 114, 116 whose outputs are coupled to transformer 118 to convert to a single-ended output 120. Upper and lower frequencies labeled in conjunction with the tunable front end filter 402 and fixed preselectors 114, 116 are provided in this figure for exemplary purposes only.

Those skilled in the art will recognize that the transistor of FIG. 4 has been used in phase splitter applications for integrated circuits. However, using the circuit as a dual output low noise amplifier to support multiple independent frequency bands in a receiver front end provides an architecture with significant benefits. By combining a dual path network with the LNA circuit, switching between bands is no longer required. Thus, losses that degrade receiver sensitivity and/or intermodulation distortion are avoided. The architecture block of the present invention can be repeated as needed to combine two bands at a time which significantly alleviates the problems associated with conventional switching approaches. Logic circuitry and parts count is significantly reduced as well. Parts count, board area and cost also present challenges when designing a receiver front end.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A receiver, including:
   a switchless front end, the switchless front end comprising:
   a low noise amplifier (LNA) having a single input for amplifying a received RF signal, the LNA providing independent collector and emitter outputs to generate first and second low noise amplified dual band signals driving separate, fixed preselectors of different frequency bands, the separate fixed preselectors coupled to a transformer to generate a single ended dual-band low noise RF output.

2. The receiver of claim 1, further comprising a second switchless front end block coupled in series to the first switchless front end block for selectively providing a dual band output.

3. The receiver of claim 1, further comprising a plurality of switchless front end blocks coupled in series by pairs and the pairs cascaded in parallel to selectively provide a multi-band output.

4. The receiver front end of claim 1, further comprising a tunable pre-selector coupled in series with the switchless front end block.

5. A receiver front end, comprising:
   first and second front end blocks cascaded in series, the first front end block comprising:
   a first low-noise-amplifier (LNA) for amplifying a received signal, the LNA generating first and second amplified signals;
   a first fixed preselector for filtering the first amplified signal utilizing a first frequency band;
   a second fixed preselector for filtering the second amplified signal utilizing a second frequency band, the first and second fixed preselectors providing a first filtered dual band signal; and
   a means for converting the first filtered dual band signal to a first single ended output signal; and
   the second front end block, comprising:
   a second low-noise-amplifier (LNA) for amplifying the first single ended output signal, the second LNA generating third and fourth amplified signals;
   a third fixed pre-selector for filtering the third amplified signal utilizing a third frequency band;
   a fourth fixed pre-selector for filtering the fourth amplified signal utilizing a fourth frequency band, the third and fourth fixed preselectors providing a second filtered dual band signal; and
   a means for converting the second filtered dual band signal to a second single ended output signal, the second output signal selectively providing two radio frequency (RF) bands.

6. The front end system of claim 5, wherein the first means for converting comprises a transformer and the second means for converting comprises a mixer.

7. The front end system of claim 5, wherein the first means for converting comprises a first transformer and the second means for converting comprises a second transformer.

8. The front end system of claim 5, wherein the front end system is a switchless system.

9. The front end system of claim 5, wherein the second single-ended output signal is provided to a frequency mixer.

10. The receiver of claim 5, wherein the receiver front end is implemented in a communication device.

11. The receiver front end of claim 5, further comprising:
    third and fourth front end blocks coupled in series, the series coupled third and fourth front end blocks also being cascaded in parallel with the first and second front end blocks between an amplifier and a transformer to selectively provide four RF bands.

12. The receiver front end of claim 11, wherein the third front end block, comprises:
- a third low-noise-amplifier (LNA) for amplifying the received signal, the third LNA generating fifth and sixth amplified signals;
- a fifth fixed pre-selector for filtering the fifth amplified signal utilizing a fifth frequency band;
- a sixth fixed pre-selector for filtering the sixth amplified signal utilizing a sixth frequency band, the fifth and sixth fixed preselectors generating a third filtered dual band signal; and
- a means for converting the third filtered dual band signal to a third single ended output signal; and wherein the fourth front end block, comprises:
- a fourth low-noise-amplifier (LNA) for amplifying the third single ended output signal, the fourth LNA generating seventh and eighth amplified signals;
- a seventh fixed pre-selector for filtering the seventh amplified signal utilizing a seventh frequency band;
- an eighth fixed pre-selector for filtering the eighth amplified signal utilizing an eighth frequency band, the seventh and eighth fixed preselectors generating a fourth filtered dual band signal; and
- a means for converting the fourth filtered dual band signal to a fourth single ended output signal; and
- a transformer for combining the second and fourth single ended output signals to a single ended output selectively providing the four RF frequency bands.

13. The receiver front end of claim 12, wherein the means for converting the first filtered dual band signal comprises a transformer and the means for converting the third filtered dual band signal comprises a transformer.

14. The receiver front end of claim 13, wherein the means for converting the second filtered dual band signal comprises a transformer and the means for converting the fourth filtered dual band signal comprises a transformer.

15. The receiver front end of claim 13, wherein the means for converting the second filtered dual band signal comprises a mixer and the means for converting the fourth filtered dual band signal comprises a mixer.

* * * * *